(12) United States Patent
Shee

(10) Patent No.: US 6,910,036 B1
(45) Date of Patent: Jun. 21, 2005

(54) DATABASE PERFORMANCE MONITORING METHOD AND TOOL

(75) Inventor: Dek J. Shee, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 471 days.

(21) Appl. No.: 10/051,903

(22) Filed: Jan. 17, 2002

Related U.S. Application Data

(63) Continuation of application No. 10/013,410, filed on Dec. 11, 2001, now abandoned.

(51) Int. Cl.[7] .............................................. G06F 17/30
(52) U.S. Cl. .................... 707/5; 707/3; 707/4
(58) Field of Search ............................... 707/3, 4, 5, 2

(56) References Cited

U.S. PATENT DOCUMENTS 5,778,354 A * 7/1998 Leslie et al. .................... 707/2

* cited by examiner

*Primary Examiner*—Charles Rones

(57) ABSTRACT

The present invention provides a method and system for monitoring the process performance of a database that accepts and records SQL statements and that records the status of a session of use of the database. The invention obtains the SQL address and hash value for each SQL statement, the current session status corresponding to each SQL statement and the previous session status corresponding to each SQL statement. The invention also records a time stamp at the time the session status information is obtained. The information gathering steps are repeated at a predetermined interval of time. Using the information gathered, the run time for each SQL statement is calculated. The run time for each SQL statement may then be reviewed to determine which SQL statements experience the greatest run time, which allows DBAs to locate the source of any performance problems.

13 Claims, 2 Drawing Sheets

DATABASE PERFORMANCE MONITORING METHOD AND TOOL

CROSS-REFERENCE TO RELATED APPLICATIONS

This application is a continuation of patent application Ser. No. 10/013,410, filed Dec. 11, 2001, abandoned, and claims priority therefrom.

STATEMENT REGARDING FEDERALLY-SPONSORED RESEARCH OR DEVELOPMENT

None.

TECHNICAL FIELD

The present invention relates to database performance monitoring. More particularly, the invention relates to a method and tool for monitoring the process performance of a database to obtain the time needed to process requests and statements without tracing the database.

BACKGROUND OF THE INVENTION

Databases have seen an increase in use over the years. A database is a collection of data that is organized on a computing device so that its contents can easily be accessed, managed, and updated. The most prevalent type of database is a relational database. A relational database is a tabular database in which data is defined so that it can be reorganized and accessed in a number of different ways. Databases contain aggregations of data records or files, such as sales transactions, product catalogs and inventories, and customer profiles. There are at least three key players in the use of these databases; a database administrator or DBA, one or more application developers, and the users within the user community. Typically, a DBA directs or performs all activities related to maintaining a successful database environment. The responsibilities of a DBA include designing, implementing and maintaining the database system; establishing policies and procedures pertaining to the management, security, maintenance and use of the database management system (DBMS) and training employees in database management and use.

Developers are charged with developing the application code used by the user community to access and utilize the database. The application code may be written in a variety of languages, such as JAVA, COBAL, or C++. However, the developer will embed Structured Query Language (SQL) within the application code, which is then used to communicate with the database. SQL is a standard interactive user and program interface language for communicating with the database, such as for getting information from the database or for updating the database. SQL queries take the form of a command language that lets the user select, insert, update and find the location of data, among other things.

The final key player is the user within the user community. The user may be any of a number of individuals and may access the database for any of a number of reasons. One of the most important aspects of database use to the user is the response time experienced when a request is sent. Thus, one of the major tasks of developers and DBAs is lower the response time as much as possible. Over the last few years, databases have seen an enormous growth in size. This growth adds to the already challenging task of maintaining and increasing the performance of the databases. Developers must craft efficient application codes and DBAs must tune the databases to help meet the required or desired processing windows. Despite the best efforts of the developers and the DBAs, many users remain dissatisfied with the response times experienced in the use of the database.

One of the challenges experienced by DBAs is determining the root cause of performance problems that lead to longer response times. In a typical scenario, a user will experience less than desirable response times, and will voice a concern to the DBA or developer. Typically, both the user and the developer initially take the position that the database is the source of the problem. The DBA then faces the challenge of demonstrating to the user and developer that the database may not be the root cause of the performance problem. There are three basic problem areas within the structure of a database system that could be responsible for the performance problem. First, the problem could exist within the database and its management. The database problems could result from unnecessary constraints and bottlenecks. Second, the problem could exist within the network connecting the user to the database. The network problems are largely caused by bottlenecks or limitations of the network bandwidth. Third, the problem could exist within the application code written by the developer. Application code problems typically result from poorly or inefficiently drafted SQL statements. A poorly written SQL statement can be defined as one that consumes many buffers, consumes more disk input/output (i/o) than is necessary or one that runs for a long period of time. Normally, SQL statements that have long execution times are also those that consume many buffers and result in large disk i/o.

Thus, it typically falls upon the DBA to determine which of the above three problem areas is responsible for the poor performance. As noted above, by default, the user community typically assumes that the cause of the problem is the database. This reflects poorly on the DBA, especially if the problem is not caused by the database. The DBA can control the database management, but not the application code being used or the network and any problems associated with the network. To understand the source of the performance problems, a DBA needs to know what SQL statements the users are executing, how long each statement runs, and any process bottlenecks experienced. Unfortunately, databases existing on the market today, such as the widely used Oracle database family from Oracle Corporation, do not make this process intuitive or easy.

If a user complains to the DBA that a particular job or request was slow in executing, the job is typically already done executing. To better understand the problem, the DBA can ask the user to rerun the job. The DBA can then use existing database tracing tools to trace the run time associated with the job. This tracing process is very accurate, but is burdensome to the database. In other words, the tracing process imposes an additional load on the database by requiring CPU cycles from the server. Moreover, the tracing process generates large trace files that often consume all of the available storage. The tracing process also consumes the time of the DBA in administering the trace and in analyzing the trace results. Because of the above noted problems, it is not practical or operationally possible to capture database-wide performance data on more than an ad-hoc basis. DBAs must use the tracing process sparingly, and thus have only a limited operational knowledge about the performance of the database, which can translate into poor user customer service.

Currently, there is no available method or tool that can be used by DBAs to monitor the process performance of the database that does not impose a large amount of overhead on the database system and the resources of the DBA. It would be desirable to provide a method and tool for obtaining process performance data about the database and its use without imposing additional overhead on the database. It would also be desirable to provide process performance data in a manageable form that can be quickly analyzed to ascertain information about the run time of each SQL statement issued to the database.

SUMMARY OF THE INVENTION

The present invention provides a method and system for use with database administration. More specifically, the present invention provides a method and system for monitoring the process performance of a database that accepts and records SQL statements and that records the status of a session of use of the database. The invention obtains the SQL address and hash value for each SQL statement, the current session status corresponding to each SQL statement and the previous session status corresponding to each SQL statement. The invention also records a time stamp at the time the session status information is obtained. The information gathering steps are repeated at a predetermined interval of time. Using the information gathered, the run time for each SQL statement is calculated. The run time for each SQL statement may then be reviewed to determine which SQL statements experience the greatest run time, which allows DBAs to locate the source of any performance problems. The invention includes generating reports containing the calculated run times that are easily reviewed by the DBA.

Additional advantages and novel features will be set forth in the description which follows and in part may become apparent to those skilled in the art upon examination of the following, or may be learned by practice of the invention.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

The present invention provides a system and method that provides DBAs an opportunity to monitor the process performance experienced by users of the database without imposing an unnecessary burden on the database. The invention combines information retained by the database to obtain approximate run times associated with identified SQL statements. A report is generated at a desired frequency which is easily analyzed to determine the root cause of any performance problems. Through use of the present invention, the performance of the database system can be enhanced on a proactive basis without the need to wait for users to complain about particular problem areas.

Figure 1:
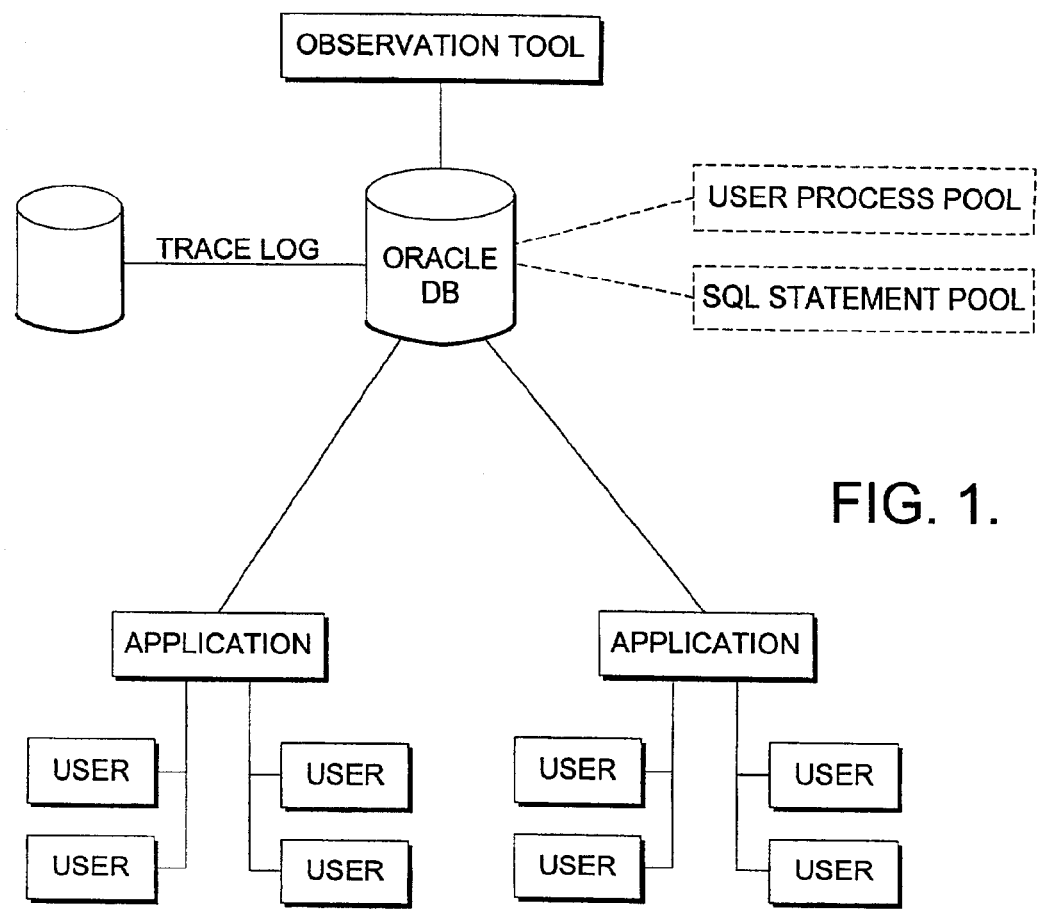
FIG. 1 is a schematic diagram of an overall system suitable for use in implementing the present invention.

The basic system used in connection with the present invention is shown in FIG. 1. As seen in FIG. 1, a database 10 is provided. Database 10 contains, among other things, a user process pool 12 and a statement pool 14, further details of which are described more fully below. Database 10 may be accessed by a number of users 16 through one or more applications 18. Users 16 can be any of a variety of people that access and use database 10 for a variety of reasons. For example, an officer of a company may wish to utilize database 10 to acquire financial data regarding the company over a period of time. Alternatively, a marketing representative of a company may wish to utilize database 10 to acquire sales information. The uses of database 10 are virtually limitless. Users 16 communicate with database 10 through applications 18. Applications 18 are typically provided by developers within the company utilizing database 10, such as an information services or IS group within the company. The applications 18 can be written in java, C++, COBAL or other languages. However, SQL is imbedded within the application code, which allows communication with database 10. Database 10 understands the SQL statements and communicates any requested information back to the user 16. The communication between database 10 and users 16 takes place across a network 20.

As mentioned above, database 10 is typically capable of performing a trace of the activities taking place on the database. Typically, if a user 16 complains to the DBA about a slow response time experienced in using database 10, the DBA can request the user to rerun the particular job at issue, and then activate the tracing feature of the database 10. The tracing feature produces a trace log file 22, which is stored on disk. The trace log 22 could be used by the DBA to determine the cause of the performance problems experienced by user 16. However, the trace log file 22 is very large, usually on the order of hundreds of megabytes per trace. Because the file 22 is so large, it is difficult to analyze in a time efficient manner. Finally, because the trace log is generated by the database 10, the generation of the trace log 22 requires valuable system resources and CPU time. For all of these reasons, it is not operationally possible to utilize the tracing feature of database 10 on a continual basis.

The invention provides an observation tool 24 to address the above noted deficiencies with trace log file 22. Observation tool 24 communicates with database 10 to observe the process performance experienced by users 16 in their interaction with database 10. Observation tool 24 can be used to continually monitor the database 10 and can produce a report that is more easily analyzed by a DBA than the trace log file 22. The report generated is much smaller than the trace log file 22 and therefore consumes far less disk space than the trace log file 22. The methodology used by observation tool 24 is discussed in detail with reference to FIG. 2. Prior to the discussion of FIG. 2, further details of database 10, user process pool 12 and statement pool 14 will be described.

Database 10 is a relational database that is in common use today. As an example, the invention is particularly suited for use with an Oracle Corporation database. The database accepts SQL statements for processing from the users 16 through applications 18. Within the database 10 are the user process pool 12 and the SQL statement pool 14. User process pool 12 collects and stores a variety of information about the users 16. User process pool 12 stores the username for the user 16, the login time, the status of the process, the SQL hash value and SQL address, the previous SQL hash value and the previous SQL address. The status of the process is either active or inactive. An active process is one for which a SQL statement has been received by the database 10 that the database 10 is still working on. In other words, an active process in one that has not yet been completed. The SQL hash value and SQL address map to a corresponding SQL hash value and SQL address within the SQL statement pool 14. The SQL hash value and SQL address indicate the current SQL statement that is being processed by the database 10 for the particular user 16. The previous SQL hash value and the previous SQL address indicate the immediately preceding SQL statement that was processed by the database 10 for the particular user 16. Importantly, the user process pool 12 does not contain any run time information regarding the SQL statements being processed. The database 10 thus tracks the SQL statements being submitted but does not track the run time associated with each SQL statement. SQL statement pool 14 contains, among other things, unique SQL hash values and SQL addresses that correspond to SQL statements. In addition, the SQL statement pool 14 may contain information regarding memory usage and disc usage. Therefore, the pools 12 and 14 provide a history of all of the queries and the resources they have consumed, but do not provide any information regarding the time consumed by the queries.

When a user 16 logs into the database 10, the user name and login time are recorded in user pool 12. When the user 16 submits a statement or request to the database 10, the status of the process becomes active. In addition, the SQL hash value and address are recorded. For example, suppose User1 submits Query1 to the database. User1 is recorded in the user pool 12 and Query1 is recorded in the statement pool 14. As soon as the user hits enter, the status of the process is updated to active within user pool 12 because the SQL query is now being processed by the database 10. This information is used by observation tool 24 to generate a report for the DBA regarding the process performance experienced by users 16. In other words, observation tool 24 tracks and records the run time experienced by each user for the particular SQL statements being submitted.

Figure 2:
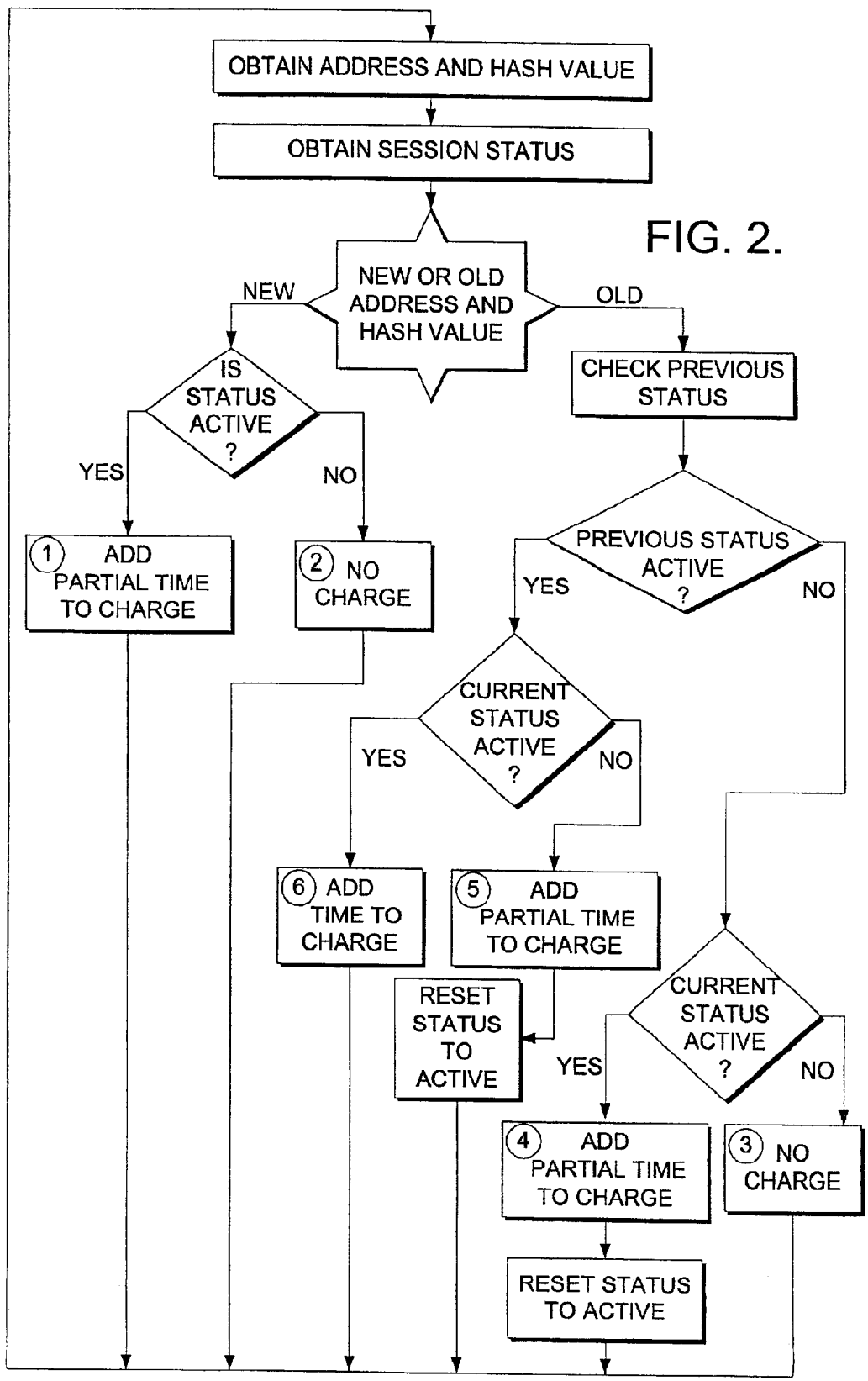
FIG. 2 is a flow chart illustrative of one embodiment of the present invention.

The methodology used by observation tool 24 is best understood with reference to FIG. 2. Broadly, the invention monitors the status of the session and the SQL statement for the session. If the status is active, the invention looks to see what SQL statement is currently being processed and tracks how long, utilizing an accounting process, the SQL statement requires for processing.

The methodology begins by recording a time stamp, as shown at 26 in FIG. 2. The time stamp is used as a reference so that the status of the session and the address and hash value of the SQL statements at a specific point in time are known. The process continues by obtaining the address and hash value of the SQL statements for a particular user, as shown at 28. The session status is also obtained, as shown at 30. The session status reflects whether the database 10 is still processing the SQL statement and is active, or is done processing the SQL statement and is inactive. A number of different scenarios are accounted for in the remaining process of FIG. 2. The scenarios depend on whether the address and hash value are new or old, whether the session status is active or inactive, and whether the previous session status is active or inactive. The first step in determining which of the scenarios is taking place is to determine whether the address and hash value obtained in step 28 are new or old, as shown by 32.

If the address and hash value are new, it means that a new SQL statement is being processed by database 10 that has not previously been processed for that particular session. If the address and hash value are new, the process continues by determining whether the status of the session is active or inactive, as shown at 34. If the status of the session is active, it means that the database 10 is still processing the new SQL statement. As such, the time needed to process the SQL statement needs to be accounted for. To that end, a time charge is noted and added to the time required by this particular SQL statement, as shown at 36.

In a preferred embodiment, the process of FIG. 2 is executed on a regular incremental time basis, such as every ten minutes. The time interval can be decreased or increased depending on the accuracy needs of the DBA. For example, by reducing the time interval, the accuracy of the information obtained increases. As noted at step 36, a partial time increment is added to the time charge for the SQL statement. In a preferred embodiment, the time charge added at step 36 is twenty-five percent of the given time increment. In other words, if the time interval being used in the process of FIG. 2 is set to ten minutes, the scenario ending at step 36 would result in a charge of 2.5 minutes being added to the record for the particular SQL statement being executed by a particular user 16.

If the status is determined to be inactive at step 34, then no charge is added to the record for the new SQL statement, as shown at 38. This scenario reflects the case where a new SQL statement is experienced by the session, but which has been processed by the database 10 within the time interval that has been set. In other words, if the time interval is ten minutes, the new SQL statement is received and executed by database 10 within the ten minute interval. Because the SQL statement is executed within the interval, no charge is recorded for the SQL statement.

Returning to step 32, if the SQL address and hash value obtained for the user are determined to be old, the process continues at step 40 by checking the previous session status. As shown at 42, the process determines whether the previous session status was active. This information is used along with the current session status. Therefore, if the previous session status was active, the current session status is determined, as shown at 44. If the current session status is active, a time charge is added to the record for this SQL statement and user as shown at 46. Because the previous session status was active and the current session status is active, the database 10 was processing the SQL statement for the full interval. Thus, the full time interval is added to the time charge in this instance. If the time interval is ten minutes, then a ten minute time charge is added to the record for the SQL statement. Returning to step 44, if the current session status is determined to be inactive, a partial interval time charge is added to the record for the SQL statement and user, as shown at 48. The session status is also reset to inactive, as shown at 50. This scenario applies to a situation where the SQL statement was being processed by the session in the previous time interval, but processing was completed sometime during the current time interval. Thus, only a partial-interval time charge is added to the record for the SQL statement since the database 10 is not processing the SQL statement for the full time interval. As an example, half of the time interval can be added to the time record for the SQL statement. If the time interval is ten minutes, a five minute time charge can be added to the time record for the SQL statement.

Returning to step 42, if the previous session status is determined to be inactive, the current session status is determined at 52. If the current session status is active, a partial time charge is added to the record for the SQL statement as shown at 54. This scenario addresses the situation where the SQL statement has been seen before by the session, the previous session status was inactive, but the current session status is active. Because the database 10 is not processing the SQL statement for the full length of the interval, only a partial time charge is added, and the session status is reset to active as shown at 56. As an example, if the time interval is ten minutes, a partial time charge of half the interval, or five minutes, can be added to the time charge for the SQL statement. If, however, the current session status is determined to be inactive in step 52, no charge is added to the time record, as shown at 58. This reflects the scenario where the SQL statement is old for the session, but the previous and current session status are inactive. In this scenario, the SQL statement is merely waiting to be aged out of the least recently used (LRU) list.

After steps 36, 38, 46, 50, 56 and 58, the process waits the predetermined time interval and returns to step 26 to record the current time stamp. If the time interval is ten minutes, the process described above with reference to FIG. 2 takes place every ten minutes. Time charges are recorded for each SQL statement along with the user issuing the SQL statement. Returning to FIG. 1, when, a user 16 submits a query to database 10 through application 18, observation tool 24 operates as described with reference to FIG. 2 to monitor the session. Each SQL statement in the session is tracked and a run time for the statement is recorded. The process of FIG. 2 is used to total the run time for each SQL statement. It should also be understood that certain sessions are not activated by a user 16, but are scheduled queries that run on a regular basis. These sessions may be known as batch jobs and the invention applies equally to the execution of batch jobs as well.

The invention thus gathers a time stamp, a user identification such as the username, the SQL address and hash value and the session status information. This information is used to calculate the run time for each SQL statement received by database 10. Using this information, the DBA can demonstrate to developers and the user community the source of the performance problems. The SQL statements having long run times can be identified, and the application code associated with the SQL statements can be revised to improve the efficiency of the code.

The invention can be used to generate a report that is useful to the DBA on a regular basis. The report will preferably contain the user name, the SQL address, the SQL hash value, the SQL statement text and the execution time of the SQL statement calculated as described above with reference to FIG. 2. It can therefore be seen that the present invention can be used to extract SQL statements from the database 10 and determine the run time associated with each SQL statement, without imposing the overhead required by tracing the database. The invention provides the user community a better level of customer service and allows the DBA to focus tuning efforts on long-running application statements.

Alternative embodiments of the present invention become apparent to those skilled in the art to which it pertains upon review of the specification, including the drawing figures. The various computer systems and components shown in FIG. 1 and described in the specification are merely exemplary of those suitable for use in connection with the present invention. Accordingly, the scope of the present invention is defined by the appended claims rather than the foregoing description.

What is claimed is:

1. A computer-readable medium having computer-executable instructions for performing a method for monitoring the process performance of a database, the database accepting and recording SQL statements and recording the status of a session of use of the database, comprising:

obtaining the SQL address and hash value for each SQL statement;

obtaining the current session status corresponding to each SQL statement;

recording a time stamp at the time the session status is obtained;

repeating the obtaining steps and the time stamp recording step at a plurality of time intervals; and calculating the run time for each SQL statement based upon the obtained SQL address and hash value, the time stamp and upon the current session status, whereby the run time for each SQL statement is reviewable to determine which SQL statements experience the greatest run time.

2. A computer system having a processor, a memory, and an operating environment, the computer system operable to execute a method for monitoring the process performance of a database, the database accepting and recording SQL statements and recording the status of a session of use of the database, comprising:

obtaining the SQL address and hash value for each SQL statement;

obtaining the current session status corresponding to each SQL statement;

recording a time stamp at the time the session status is obtained;

repeating the obtaining steps and the time stamp recording step at a plurality of time intervals; and calculating the run time for each SQL statement based upon the obtained SQL address and hash value, the time stamp and upon the current session status, whereby the run time for each SQL statement is reviewable to determine which SQL statements experience the greatest run time.

3. A method for use in a computer system for monitoring the process performance of a database, the database accepting and recording SQL statements and recording the status of a session of use of the database, the method comprising:

obtaining a SQL address and hash value for each SQL statement;

obtaining a current session status corresponding to each SQL statement;

recording a time stamp at the time the current session status is obtained;

repeating the obtaining steps and the time stamp recording step at a plurality of time intervals; and calculating a run time for each SQL statement based upon the obtained SQL address and hash value, the time stamp and the current session status, whereby the run time for each SQL statement is reviewable to determine which SQL statements experience the greatest run time.

4. The method of claim 3, wherein the calculating step further comprises:

determining whether each SQL statement is new to the database session, and if so, determining whether the current session status is active and applying an addition to the run time for the SQL statement if the current session status is active.

5. The method of claim 4, where the addition to the run time is a portion of the time interval.

6. The method of claim 5, where the portion is one-quarter of the time interval.

7. The method of claim 3, wherein the calculating step further comprises:

obtaining the previous session status corresponding to each SQL statement;

determining whether each SQL statement is new to the database session, and if not, determining the previous session status for the SQL statement and the current session status for the SQL statement; and applying a first addition to the run time for the SQL statement if the previous session status is active.

8. The method of claim 7, further comprising applying a second addition to the run time for the SQL statement if the previous session status is inactive and the current session status is active.

9. The method of claim 8, where the second addition to the run time if the previous session status is inactive and the current session status is active is a portion of the time interval.

10. The method of claim 7, where the first addition to the run time if the previous session status and the current session status is active is the full amount of the time interval.

11. The method of claim 7, where the first addition to the run time if the previous session status is active and the current session status is inactive is a portion of the time interval.

12. The method of claim 3, further comprising generating a report containing a listing of each SQL statement and the run time corresponding to each SQL statement.

13. The method of claim 12, where the report contains the SQL address and hash value.

* * * * *